United States Patent [19]

Pangborn et al.

[11] 3,939,257

[45] Feb. 17, 1976

[54] PROCESS FOR PRODUCING HYDROGEN FROM WATER

[75] Inventors: Jon B. Pangborn, Lisle; John C. Sharer, Evanston, both of Ill.

[73] Assignee: American Gas Association, Arlington, Va.

[22] Filed: Aug. 20, 1973

[21] Appl. No.: 390,178

[52] U.S. Cl. ............... 423/658; 423/481; 423/493; 423/579; 423/632; 423/657
[51] Int. Cl. ....... C01b 1/02; C01b 1/05; C01b 7/08
[58] Field of Search ........... 423/657, 658, 493, 632, 423/481, 579

[56] References Cited
OTHER PUBLICATIONS

Jacobson's "Encyclopedia of Chemical Reactions," Vol. 4, 1951 Ed., pp. 37 and 51, Reinhold Pub. Corp., New York.

J. W. Mellor's "A Comprehensive Treatise on Inorganic and Theoretical Chem.," Vol. 3, 1923, p. 158, and Vol. 13, 1934, p. 758, and Vol. 14, Part 3, 1935, p. 21, Longmans, Green & Co., New York.

*Primary Examiner*—Edward Stern
*Attorney, Agent, or Firm*—Thomas W. Speckman

[57] ABSTRACT

A process for the production of hydrogen and oxygen from water comprising the steps of forming ferric chloride from ferriferrous oxide by reaction with a chloride ion yielding substance, reducing the ferric chloride produced with a reducing agent to produce ferrous chloride, and then oxidizing the ferrous compound with water so as to produce hydrogen. Suitable reducing agents include cuprous chloride, chromous chloride and platinum. Several reactant regenerative closed cycle systems are disclosed utilizing the process of this invention for the production of hydrogen with high energy efficiencies.

15 Claims, 4 Drawing Figures

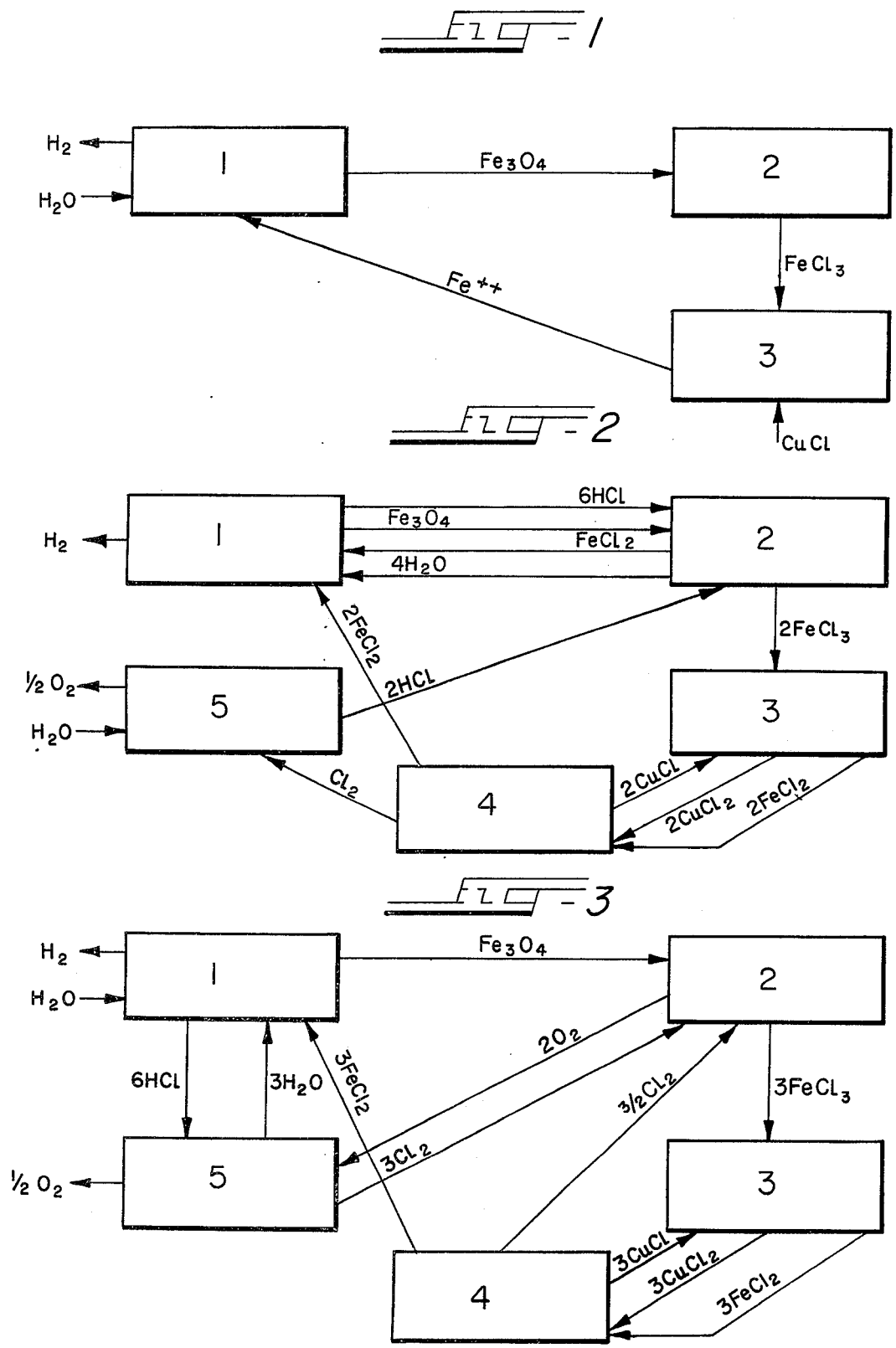

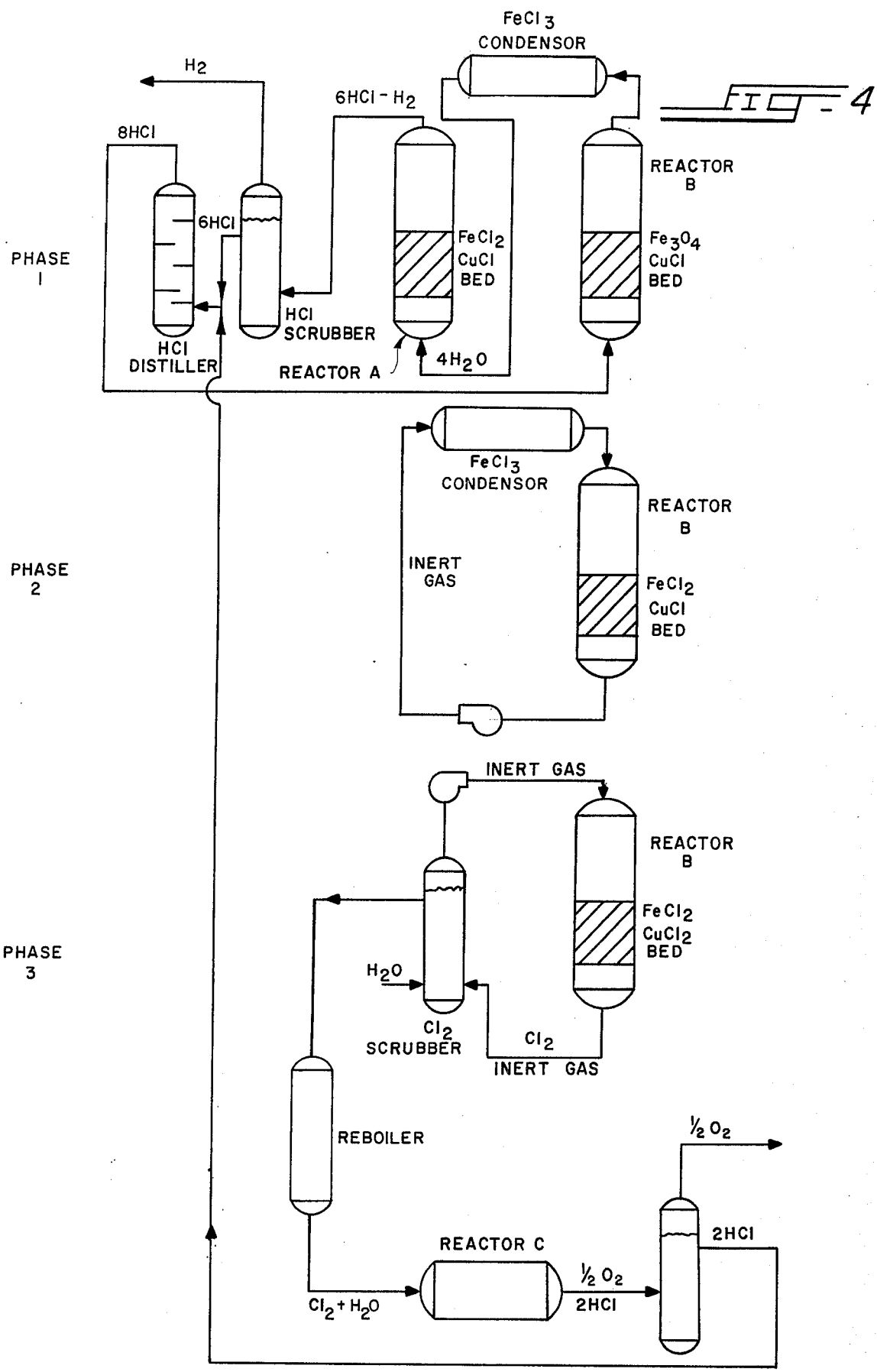

PROCESS FOR PRODUCING HYDROGEN FROM WATER

This invention relates to a chemical process for the production of hydrogen from water. The process provides a closed cycle reactant regenerative process for the production of hydrogen from water requiring input of water and heat.

Thermochemical cycles to produce hydrogen have been sought in recent years to provide hydrogen for use both as a fuel and as a chemical reactant. Especially in view of ecological and pollution considerations, the use of hydrogen as a fuel has attained greater significance. Hydrogen may be produced from water, a cheap and abundant raw material, and when burned reverts to water, a non-polluting chemical. Hydrogen may be readily stored and transported. Hydrogen also affords extreme flexibility in its utilization as a fuel providing advantages in many ways over present fuels for power sources such as turbines, reciprocating engines and fuel cells.

The present commercial method for the production of hydrogen is the electrolysis of water into its constituent elements of hydrogen and oxygen. The electrolysis process is dependent upon electricity, and therefore its economics are dependent upon generating of electrical energy which is inefficient. Further, industrial electrolyzers are very expensive.

Direct thermodecomposition of water is not promising since water starts breaking with a reasonable yield at temperatures of 2500° to 3000°C. These temperatures are not attainable from heat sources such as nuclear reactors. Therefore, chemical cycles for production of hydrogen from water at temperatures attainable from the output coolant of nuclear reactors would be desirable. With the greatly expanded use of nuclear reactors, it would be advantageous to utilize the heat given off by the reactor to produce hydrogen and oxygen from the water molecule providing a new fuel. High temperature gas reactors have output coolant temperatures in the order of 500° to 800°C. This heat output represents about 80 percent of the product energy from the nuclear reactor. Recent trends have been toward increases in the output coolant temperature and such temperatures in the order of 1000° to 1200°C. can be expected as a development of present technology. Direct thermochemical processes, utilizing such heat energy, have been sought in recent years.

Various thermochemical cycles for the production of hydrogen from water and the desirability of such production have been reviewed by C. Marchetti in "Hydrogen and Energy", Chemical Economy & Engineering Review, January 1973, (Vol. 5, N.1).

A four step chemical cycle has been described by G. De Beni in French Pat. No. 2,035,558, Feb. 17, 1970, working with compounds of mercury, bromine, and calcium. This process is described as the Mark-1 cycle by Marchetti. The Mark-1 process has disadvantages in requiring the use of highly corrosive chemicals at pressures of in excess of 20 atmospheres, and the use of mercury with its inherent pollution problems. Marchetti has calculated efficiencies in the order of 55 percent, but actual process problems have not been solved.

Vanadium and chlorine cycles, designated as Mark-3 by Marchetti, have been proposed J. E. Funk "Thermodynamics of Multi-Step Water Decomposition Processes" ACS Symposium on Non-Fossil Fuels, Volume 16, No. 4, American Chemical Society, 1972, but favorable conditions for reaction have not been found and energy efficiencies are very low.

A process utilizing cesium metal is described in U. S. Pat. No. 3,490,871, January 20, 1970. While no experimental work is reported in the patent, it appears the process requires temperatures of at least 1200°C. and presents difficult separations.

A process has been patented by De Beni, Luxemburg Pat. No. 60,372, Feb. 18, 1970, requiring the reduction of $Fe_2O_3$ to $Fe_3O_4$ at about 1400°C., an impractically high temperature from the standpoint of nuclear heat sources.

A process has been suggested by B. M. Abraham, Science, Vol. 180, June 1, 1973, pg. 959–960, using lithium nitrite and iodine. It is recognized that no confirming work has been done.

A process has been proposed by C. Hardy, designated as Mark-7 cycle by Marchetti, wherein hydrochloric acid formed in the reaction is transformed into iron chloride which reacts with water to produce hydrogen. We have experimented with similar cycles, but have not been able to successfully regenerate ferrous chloride by reduction of ferric chloride following the described reactions.

It is an object of this invention to provide a process for producing hydrogen from water wherein ferriferrous oxide and a chloride ion yielding substance is reacted to produce ferric chloride which is reduced with a reducing agent selected from the group consisting of cuprous chloride, chromous chloride and platinum to produce ferrous chloride and reacting the ferrous compound with water so as to produce hydrogen.

It is a further object of this invention to provide a process for the production of hydrogen from water in which the reactants other than water are regenerated and the reaction may be conducted in a closed cycle.

It is another object of this invention to provide a process wherein the reaction products are easily separable.

It is another object of this invention to provide a process for the production of hydrogen from water wherein the thermal coolant output of nuclear reactors may be utilized to provide necessary heat.

It is still a further object of this invention to provide a process having high energy efficiency for the production of hydrogen from water.

It is another object of this invention to provide a process for the production of hydrogen from water wherein the transfer of materials from one reaction site to another takes place in the gaseous phase.

These and other objects, advantages and features of this invention will be apparent from the description together with the drawings, wherein:

FIG. 1 is a schematic flow diagram of a process for the production of hydrogen according to this invention;

FIG. 2 is a schematic flow diagram of one embodiment of a reactant regenerative closed cycle process according to this invention utilizing hydrochloric acid;

FIG. 3 is a schematic flow diagram of another embodiment of a reactant regenerative closed cycle process of this invention utilizing chlorine; and FIG. 4 is a process flow diagram of one embodiment of this invention This invention provides a process for the production of hydrogen from water comprising the steps of forming ferric chloride from ferriferrous oxide by reaction with a chloride ion yielding substance; reducing the ferric chloride produced with reducing agent to produce ferrous chloride, and then oxidizing the ferrous compound with water so as to produce hydrogen. Preferred reducing agents are selected from the group consisting of cuprous chloride, chromous chloride and platinum. Cuprous chloride is especially preferred.

When hydrogen chloride is used as the chloride ion yielding substance the reaction may be expressed by the Equation $$Fe_3O_4 + 8HCl \rightarrow 2FeCl_3 + FeCl_2 + 4H_2O \qquad \text{I-2}$$

The reaction of ferriferrous oxide with hydrogen chloride proceeds well at temperatures of about 125° to 300°C. When chlorine is used as the chloride yielding substance the reaction may be expressed by the Equation $$Fe_3O_4 + 9/2Cl_2 \rightarrow 3FeCl_3 + 2O_2 \qquad \text{II-2}$$

The reaction proceeds well with chlorine at about 800° to 1000°C.

The ferric chloride produced by the reactions shown by Equations I-2 and II-2 may then be reduced by reaction with cuprous chloride to produce ferrous chloride according to Equation $$2FeCl_3 + 2CuCl \rightarrow 2FeCl_2 + 2CuCl_2 \qquad \text{I-3}$$

and when hydrogen chloride is used the Equation $$3FeCl_3 + 3CuCl \rightarrow 3FeCl_2 + 3CuCl_2 \qquad \text{II-3}$$

when chlorine is used. These reactions proceed well at about 200° to 300°C.

The ferrous compound produced may then be oxidized with water (steam) according to the Equation $$3FeCl_2 + 4H_2O \rightarrow Fe_3O_4 + 6HCl + H_2 \qquad \text{I-1 and II-1}$$

when hydrogen chloride or chlorine is used. These reactions proceed well at about 450° to about 1500°C. For example, the temperature can be about 600° to about 900°C.

The combination of above reactions, utilized in this invention, are schematically shown in the flow diagram of FIG. 1. The flow diagram of FIG. 1 is not chemically balanced, but is presented to show in a simplified manner the overall cycle of reactions discussed above. Further description of the above reactions is set forth in the description to follow setting forth preferred embodiments of this invention in a reactant regenerative closed cycle.

The ferrous compound produced by the reactions of equations I-3 and II-3 may be exchanged to result in another desired ferrous compound, such as ferrous oxide, for oxidation with water so as to produce hydrogen.

Accordingly, the general process of this invention can be described as a process for the production of hydrogen from water the steps comprising: providing ferriferrous oxide and a chloride ion yielding substance to a reaction zone to produce ferric chloride; reducing the ferric chloride produced with cuprous chloride to produce ferrous chloride; and then oxidizing the ferrous compound with water so as to produce hydrogen.

While the above described process does provide a suitable method for the production of hydrogen from water, it requires the continuous addition of new reactant chemicals other than water and does not recycle all of the product chemicals. It is highly desirable both from the standpoint of pollution and process economy to minimize undesired products and the necessity of continuous addition of new reactants. By the term reactant regenerative closed cycle system we mean a system which minimizes the addition of reactant chemicals other than water and which minimizes reactant products to be removed from the system except the desired gaseous hydrogen and gaseous oxygen.

A reactant regenerative closed cycle system is provided utilizing the above process by the process scheme using hydrogen chloride as follows:

$$3FeCl_2 + 4H_2O \rightarrow Fe_3O_4 + 6HCl + H_2 \qquad \text{I-1}$$
$$Fe_3O_4 + 8HCl \rightarrow 2FeCl_3 + FeCl_2 + 4H_2O \qquad \text{I-2}$$
$$2FeCl_3 + 2CuCl \rightarrow 2FeCl_2 + 2CuCl_2 \qquad \text{I-3}$$
$$2CuCl_2 \rightarrow 2CuCl + Cl_2 \qquad \text{I-4}$$
$$Cl_2 + H_2O \rightarrow 2HCl + 1/2O_2 \qquad \text{I-5}$$

$$H_2O \rightarrow H_2 + 1/2O_2$$

The equation numbers at the right of the equations correspond throughout this description, numbers I-1, I-2, and I-3 described above for the general reaction being the same equations used in the regenerative closed cycle shown. The process shown by the above formulas is schematically shown in the flow diagram of FIG. 2.

A reactant regenerative closed cycle system is provided utilizing the above process by the process scheme using chlorine as follows:

$$3FeCl_2 + 4H_2O \rightarrow Fe_3O_4 + 6HCl + H_2 \qquad \text{II-1}$$
$$Fe_3O_4 + 9/2Cl_2 \rightarrow 3FeCl_3 + 2O_2 \qquad \text{II-2}$$
$$3FeCl_3 + 3CuCl \rightarrow 3FeCl_2 + 3CuCl_2 \qquad \text{II-3}$$
$$3CuCl_2 \rightarrow 3CuCl + 3/2Cl_2 \qquad \text{II-4}$$
$$6HCl + 3/2O_2 \rightarrow 3Cl_2 + 3H_2O \qquad \text{II-5}$$

$$H_2O \rightarrow H_2 + 1/2O_2$$

The process shown by the above formulas is schematically shown in the flow diagram of FIG. 3.

It is seen in all of the above cycles the reaction of ferrous chloride with water to produce hydrogen gas follows the same equation. Equations I-1 and II-1 are the same. The reduction of ferric chloride to ferrous chloride with cuprous chloride is the same except for quantities used (Equations I-3 and II-3). However, the stoichiometric relationships are the same. The regeneration of cuprous chloride is the same except for quantities used (Equations I-4 and II-4). Again, the stoichiometric relationships are the same. The reaction of ferriferrous oxide with a chloride ion producing substance is different depending upon the chloride ion producing substance used (Equations I-2 and II-2). The reaction resulting in evolution of oxygen gas is also different dependent upon the chloride ion producing substance used.

The reactions of Equations I-1 and II-1 can be performed in a flow type reactor where steam is continuously passed over solid or molten ferrous chloride. Gaseous hydrogen and hydrogen chloride are evolved and exit in the gas stream leaving solid ferriferrous oxide. The hydrogen and hydrogen chloride may be readily separated by any suitable method such as thermal separation. The suitable temperature range for Equations I-1 and II-1 is about 450° to about 1500°C. Preferred temperatures are about 600° to about 900°C.

The reactions of Equations I-2 and II-2 can be performed in a flow type reactor by passing gaseous hydrogen chloride or chlorine, respectively, over solid ferriferrous oxide. When hydrogen chloride is used solid ferric and ferrous chloride remain and the produced steam exits in the gas stream (Equation I-2). The reaction of Equation I-2 may be carried out at about 125° to about 300°C. Preferred temperatures are about 125° to about 250°C. When chlorine is used, gaseous dimer ferric chloride and oxygen exit in the gas stream. Suitable temperatures for the reaction of Equation II-2 are about 800° to about 1000°C. Preferred temperatures are about 875° to about 900°C. At the temperatures used for this reaction the ferric chloride is in the gaseous dimer state, $Fe_2Cl_6$. The $Fe_2Cl_6$ condenses to crystalline $FeCl_3$ at temperatures lower than about 300°C. The dimer has been noticed to exist as a condensing gas at temperatures as low as 200°C. Such crystallization takes place on a cool surface such as the reactor exit chamber.

The reactions of Equations I-3 and II-3 may be carried out by heating solid ferric chloride to about 200° to 300°C. where sublimation results in gaseous $FeCl_3$ and its dimer $Fe_2Cl_6$. Preferred temperatures are about 250° to about 300°C. The vapors are passed through a packed bed of cuprous chloride particles where the ferric chloride is reduced to ferrous chloride which is removed in the gaseous stream.

The solid cupric chloride may be regenerated to cuprous chloride by heating to about 400° to about 600°C. However, the ferrous chloride-cupric chloride mixture resulting from the reactions of Equations I-3 and II-3 requires temperatures of about 250° to about 350°C., preferred temperatures are about 275° to about 300°C. to regenerate the cupric to cuprous chloride. This is represented by the reactions of Equations I-4 and II-4. The gaseous chlorine evolved is removed as a gaseous stream.

The reactions represented by Equations I-5 and II-5 are the reverse of each other and are gas phase reactions which may be run in a flow reactor. Catalysis is not necessary unless accelerated reaction is desired. Suitable catalysts for the reaction of Equation I-5 are well known in the art for the Deacon Process. The Deacon Process and suitable catalysts are described more fully in "Recent Developments in the Oxidative Recovery of Chlorine from Hydrochloric Acid", W. F. Engel, M. J. Waale and S. Muller, Chemistry and Industry, Pgs. 67–83, Jan. 13, 1962. The reaction of Equation I-5 is known as the Reverse Deacon Process. The reaction of Equation I-5 forms gaseous oxygen and gaseous hydrogen chloride which can be readily separated. The reaction of Equation I-5 can be carried out at above 650°C. with the upper temperature limit governed by the materials of construction. Preferred temperatures are about 750° to about 950°C. The reaction of Equation II-5 forms steam and gaseous chlorine which can be readily separated. The reaction of Equation II-5 can be carried out at about 200° to about 650°C. Preferred temperatures are about 350° to about 550°C.

While the reactions have been described separately above, it is seen from FIG. 2 and FIG. 3 that the separate reactions can be advantageously combined to form a reactant regenerative closed cycle. When we refer to reaction zones we do not mean physically separate volumes, but the same physical volume under different conditions such as temperature or pressure is referred to as different zones.

Referring to FIG. 2, the reactions of Equations I-1 thru I-5 can be combined to provide a five reaction zone reactant regenerative closed cycle system wherein water is added to the system and gaseous hydrogen and oxygen is removed from the system. The process of FIG. 2 comprises the steps providing steam and ferrous chloride to a first reaction zone to produce ferriferrous oxide, hydrogen chloride and hydrogen gas; removing the hydrogen produced and reacting the ferriferrous oxide and hydrogen chloride in a second reaction zone to produce ferric chloride, ferrous chloride and water; passing the ferrous chloride and water formed to the first reaction zone and reducing the ferric chloride formed in a third reaction zone with cuprous chloride to produce ferrous chloride and cupric chloride; thermally reducing the cupric chloride in a fourth reaction zone to produce cuprous chloride and chlorine and passing the ferrous chloride via the fourth reaction zone to the first reaction zone; passing the cuprous chloride produced to the third reaction zone and passing the chlorine to a fifth reaction zone, providing steam to the fifth reaction zone to produce oxygen an hydrogen chloride; and passing the hydrogen chloride produced to the second reaction zone and removing the oxygen produced.

The process shown in FIG. 2 is advantageous in that the reaction products are readily separable for recycling or for removal from the system.

FIG. 3 and Equations II-1 through II-5 provide another embodiment of a five reaction zone reactant regenerative closed cycle wherein water is added and gaseous hydrogen and oxygen are removed. The cycle shown in FIG. 3 is described as comprising the steps of providing steam and ferrous chloride to a first reaction zone to produce ferriferrous oxide, hydrogen chloride and hydrogen gas; removing the hydrogen produced, passing the hydrogen chloride produced to a fifth reaction zone and passing the ferriferrous oxide produced to a second reaction zone, reacting the ferriferrous oxide and chlorine in the second reaction zone to produce ferric chloride and oxygen; passing the oxygen formed to the fifth reaction zone and reducing the ferric chloride formed in a third reaction zone with cuprous chloride to produce ferrous chloride and cupric chloride; thermally reducing the cupric chloride in a fourth reaction zone to produce cuprous chloride and chlorine and passing the ferrous chloride via the fourth reaction zone to the first reaction zone; passing the cuprous chloride produced to the third reaction zone and passing the chlorine to the second reaction zone; reacting the hydrogen chloride and oxygen provided to the fifth reaction zone to produce oxygen gas, water and chlorine; passing the water produced to the first reaction zone, the chlorine to the second reaction zone and removing the oxygen produced.

Another reactant regenerative closed cycle system within our invention is provided utilizing the above general process scheme using hydrogen chloride as follows:

| | |
|---|---|
| $3FeO + H_2O \rightarrow Fe_3O_4 + H_2$ | III-1 |
| $Fe_3O_4 + 8HCl \rightarrow 2FeCl_3 + FeCl_2 + 4H_2O$ | III-2 |
| $2FeCl_3 + 2CuCl \rightarrow 2FeCl_2 + 2CuCl_2$ | III-3 |
| $2CuCl_2 \rightarrow 2CuCl + Cl_2$ | III-4 |
| $Cl_2 + H_2O \rightarrow 2HCl + 1/2O$ | III-5 |
| $3FeCl_2 + 3H_2O \rightarrow 3FeO + 6HCl$ | III-6 |

Equations III-2, III-3, III-4 and III-5 are identical to I-2, I-3, I-4 and I-5 respectively. The process scheme III differs from I in the conversion of ferrous chloride to ferrous oxide in the reaction shown in Equation III-6 and the oxidation of ferrous oxide with water as shown by the reaction of Equation III-1 to produce hydrogen.

The reaction of Equation III-1 can be carried out at about 125° to about 425°C., about 250° to about 400°C. being preferred. The reaction shown in Equation III-6 can be carried out at about 300 to about 450°C., about 400°C. being preferred.

The ferrous chloride may undergo any other exchange reaction, such as shown in Equation III-6 as long as the ferrous atom remains in the ferrous condition suitable for reaction with water to produce hydrogen and as long as other products of the reaction can be totally recycled with the system.

A corresponding reactant regenerative closed cycle system using chlorine is as follows:

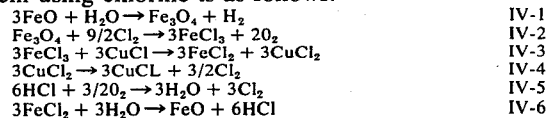

Equations IV-2, IV-3, IV-4 and IV-5 are identical to II-2, II-3, II-4 and II-5 respectively. Equations IV-1 and IV-6 are identical to III-1 and III-6 respectively. The reactions of this system may be carried out under the conditions previously set fourth for the specific reactions.

As disclosed above the ferric chloride may be reduced with chromous chloride or platinum to produce ferrous chloride in a process of this invention. When chromous chloride is used, Equation I-3, II-3, III-3 or IV-3 and Equations I-4, II-4, III-4 or IV-4 become respectively the Equations shown as

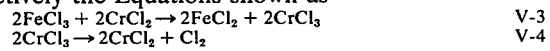

The reaction of Equation V-3 can be carried out at temperatures of about 200° to about 675°C., preferred temperatures being about 350° to 550°C. The chromic chloride can be separated from the ferrous chloride by dissolving the ferrous chloride in water at about 25° to about 100°C., the chromic chloride being insoluble. The chromic chloride itself can be regenerated to chromous chloride by heating to above about 800°C. However, the ferrous chloride-chromic chloride mixture resulting from the reaction shown as Equation V-3 can be treated directly for regeneration of chromic chloride to chromous chloride at temperatures of about 550° to 675°C., temperatures of about 575° to about 625°C. being preferred.

When platinum is used, Equations I-3, II-3, III-3 or IV-3 and Equations I-4, II-4, III-4 or IV-4 become respectively the Equations shown as

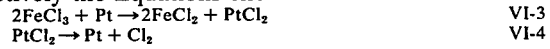

The reaction of Equation VI-3 can be carried out at temperatures of about 200° to about 550°C., preferred temperatures being about 350° to about 450°C. The platinum chloride can be regenerated to platinum above about 575°C. However, the ferrous chloride-platinum chloride mixture resulting from the reaction shown as Equation VI-3 can be treated directly for regeneration of platinum chloride to platinum at temperatures of about 450° to 550°C., temperatures of about 475° to 525°C. being preferred.

A preferred specific embodiment of this invention is set forth above denoted as process scheme I. FIG. 4 shows a suitable process flow diagram utilizing the regenerative closed cycle process scheme denoted as I. The process uses a series of sets of similar reactors and process cycles operated in parallel but out of phase with respect to process steps. The number of sets or parallel process cycles depends upon the reaction kinetics and is chosen to best match the process energy transfer requirements. Such operation allows for an optimum heat transfer pattern and good overall efficiency. For sake of clarity one set of reactors is used to describe the process.

In FIG. 4, Phase 1 shows the reactors A and B where the reactions of Equations I-1 and I-2 are carried out. Reactor A has a packed bed of ferrous chloride and cuprous chloride. Steam is passed through the bed where the reaction of Equation I occurs at a temperature of about 800°C. The solids are converted to ferriferrous oxide and the gaseous reaction products, hydrogen chloride and hydrogen, exit from the top of the reactor. The gases are separated in a hydrogen chloride scrubber, the hydrochloric acid concentrated by distillation and transferred to reactor B. Hydrogen gas is removed from the system following the separation. The hydrogen may be further purified or used directly as required.

In Phase 1, reactor B contains a packed bed of ferriferrous oxide and cuprous chloride. After the reaction of Equation I-1 has been completed in reactor A the solid product composition remaining in reactor A is the same as that of reactor B before the reaction of Equation I-2. The hydrogen chloride is passed through reactor B maintained at about 225°C. where the reaction of Equation I-2 takes place. The ferrous chloride product is non-volatile and will remain in the reactor bed. The steam and some of the volatile ferric chloride leaves reactor B and passes through a condenser which collects the ferric chloride. The steam is then recycled for utilization in reactor A.

Phase 2 includes the reaction of Equation I-3 and is performed in the apparatus shown in FIG. 4 as Phase 2 wherein reactor B is the same as reactor B in Phase 1 and in the condition after reaction of Equation I-2 has occurred. Inert gas, such as helium or nitrogen, is passed through the ferric chloride condenser wherein the ferric chloride sublimes from the condenser and is recycled to reactor B where the reaction shown by Equation I-3 takes place at a temperature of about 275°C. The inert gas is then recirculated in a closed cycle. The volumetric flow rate of inert gas can be small, just enough to give flow direction to the subliming ferric chloride.

In Phase 3, reactor B is the same as reactor B in Phase 2 and in the condition after reaction of Equation I-3 has occurred. The temperature of reactor B is raised to 290°C. and the inert gas flow rate is increased to cause a non-equillibrium condition by removal of the chlorine gas produced by the reaction shown in Equation I-4. The reverse reaction of the reaction shown by Equation I-3 does not occur significantly at this temperature and therefore, upon completion of the reaction of Equation I-4, the bed in reactor B will be primarily ferrous chloride and cuprous chloride. This reactor then is sequentially utilized in Phase 1 as reactor A.

The inert gas and chlorine gas leaving reactor B in Phase 3 is separated in a scrubbing column. Water is added to the system in the scrubbing column. The chlorinewater mixture is passed from the scrubbing column through a reboiler, vaporized and passed through reactor C where the reaction shown by Equation I-5 takes place at 800°C. The hydrogen chloride and oxygen products of reactor C are passed through a scrubber and the hydrogen chloride separated and returned to the cycle of Phase 1 for use in the reaction shown by Equation I-2. The oxygen product from the scrubber is removed from the cycle for storage or for direct use as oxygen in another chemical process.

It is noted from FIG. 4, as in all of the cycles of process schemes of this invention, that there is no transport of solids necessary in the process, all of the material transport from one reaction site to another occurring by the vapor gaseous phase. This feature is important to obtain high energy efficiencies.

The energy efficiency of the process as shown in FIG. 4 and in process scheme I has been calculated to be 40 percent. The calculation can be summarized by the total heat input to the cycle per mole of hydrogen produced due to the ideal heat requirement of all endothermic reactions and material streams, which is +224 kcal; and due to the ideal heat available from all exothermic reactions and material streams, which is −156 kcal; and due to the additional heat required because of process step temperature levels which necessarily produce waste heat, which is +56 kcal; and due to step work requirements for which further additional heat is needed, which is +46 kcal. Thus, the total process heat requirement is +170 kcal per mole of hydrogen produced. The theoretical heating value of hydrogen per mole is 68.3 kcal. Thus the energy efficiency is expressed as $$\text{Energy Efficiency} = \frac{\text{Heat Output (or Heating Value per mole } H_2)}{\text{Heat to process} + \text{Heat required for work}}$$

and is computed to be 40 percent for the cycle shown in FIG. 4

Calculating the energy efficiency of the Marchetti Mark I Process on the same basis results in an efficiency of approximately 37 percent.

The process shown in FIG. 4 is a process having higher energy efficiency than then Marchetti Mark I process, provides a process that can be carried out at low pressures, and provides a process which has been successfully tested.

All of the processes of this invention can be carried out at low pressures. Pressures of about 0.5 to about 5 atmospheres are suitable. Pressures of about 1 atmosphere are preferred.

Reactors and process equipment can be of suitable material as will be obvious to one skilled in the art. For example, glass and ceramic lined reactors are suitable.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a reactant regenerative closed cycle process for the production of hydrogen from water the steps comprising:
   providing solid ferriferrous oxide and a gaseous chloride ion yielding substance to a reaction zone to produce ferric chloride;
   reducing the ferric chloride in gaseous dimer phase with a solid reducing agent selected from the group consisting of cuprous chloride, chromous chloride and platinum to produce ferrous chloride; and
   then oxidizing the solid or molten ferrous compound with steam so as to produce hydrogen and ferriferrous oxide for recycle.

2. The process of claim 1 wherein said chloride ion yielding substance is selected from the group consisting of hydrogen chloride and chlorine.

3. The process of claim 1 wherein hydrogen chloride is used and the reaction to produce ferric chloride is carried out at about 125° to about 300°C.

4. The process of claim 3 wherein the temperature is about 125° to about 250°C.

5. The process of claim 1 wherein chlorine is used and the reaction to produce ferric chloride is carried out at about 800° to about 1000°C.

6. The process of claim 5 wherein the temperature is about 875° to about 900°C.

7. The process of claim 1 wherein the ferrous compoud is oxidized with water at about 450° to about 1500°C.

8. The process of claim 7 wherein the temperature is about 600° to about 900°C.

9. The process of claim 1 wherein the reducing agent is cuprous chloride.

10. The process of claim 9 wherein said reduction is carried out at about 200° to about 300°C.

11. The process of claim 9 wherein cupric chloride is regenerated to cuprous chloride at about 250° to about 350°C.

12. The process of claim 1 wherein the pressure is about 0.5 to 5 atmospheres.

13. The process of claim 12 wherein the pressure is about 1 atmosphere.

14. A process for production of hydrogen from water in a five zone reactant regenerative closed cycle comprising the steps;
   providing steam and ferrous chloride to a first reaction zone to produce ferriferrous oxide, hydrogen chloride and hydrogen gas;
   removing the hydrogen produced and reacting the ferriferrous oxide and hydrogen chloride in a second reaction zone to produce ferric chloride, ferrous chloride and water;
   passing the ferrous chloride and water formed to the first reaction zone and reducing the ferric chloride formed in the third reaction zone with cuprous chloride to produce ferrous chloride and cupric chloride;
   thermally reducing the cupric chloride in a fourth reaction zone to produce cuprous chloride and chlorine and passing the ferrous chloride via the fourth reaction zone to the first reaction zone;
   passing the cuprous chloride produced to the third reaction zone and passing the chlorine to a fifth reaction zone, providing steam to the fifth reaction zone to produce oxygen gas and hydrogen chloride, and
   passing the hydrogen chloride produced to the second reaction zone and removing the oxygen produced.

15. A process for production of hydrogen from water in a five zone reactant regenerative closed cycle comprising the steps:
   providing steam and ferrous chloride to a first reaction zone to produce ferriferrous oxide, hydrogen chloride and hydrogen gas;
   removing the hydrogen produced, passing the hydrogen chloride produced to a fifth reaction zone and passing the ferriferrous oxide produced to a second reaction zone, reacting the ferriferrous oxide and chlorine in the second reaction zone to produce ferric chloride and oxygen;

passing the oxygen formed to the fifth reaction zone and reducing the ferric chloride formed in a third reaction zone with cuprous chloride to produce ferrous chloride and cupric chloride;

thermally reducing the cupric chloride in a fourth reaction zone to produce cuprous chloride and chlorine and passing the ferrous chloride via the fourth reaction zone to the first reaction zone;

passing the cuprous chloride produced to the third reaction zone and passing the chlorine to a fifth reaction zone, providing steam to the fifth reaction zone to produce oxygen gas and hydrogen chloride; and passing the hydrogen chloride produced to the second reaction zone and removing the oxygen produced.

* * * * *